May 19, 1942.  E. T. FERNGREN  2,283,751
METHOD AND APPARATUS FOR FORMING HOLLOW ARTICLES
FROM ORGANIC PLASTIC MATERIAL
Filed Aug. 17, 1939  5 Sheets-Sheet 1

INVENTOR
Enoch T. Ferngren
BY Brown & Parham
ATTORNEYS

WITNESS
W. F. Werner

May 19, 1942.  E. T. FERNGREN  2,283,751
METHOD AND APPARATUS FOR FORMING HOLLOW ARTICLES
FROM ORGANIC PLASTIC MATERIAL
Filed Aug. 17, 1939  5 Sheets-Sheet 3

INVENTOR
Enoch T. Ferngren

BY *Brown & Parham*
ATTORNEYS

WITNESS
*W. F. Werner*

May 19, 1942.　　　E. T. FERNGREN　　　2,283,751
METHOD AND APPARATUS FOR FORMING HOLLOW ARTICLES
FROM ORGANIC PLASTIC MATERIAL
Filed Aug. 17, 1939　　　5 Sheets-Sheet 5

INVENTOR
Enoch T. Ferngren
BY Brown & Parham
ATTORNEYS

WITNESS
W. F. Werner

Patented May 19, 1942

2,283,751

UNITED STATES PATENT OFFICE 2,283,751

METHOD AND APPARATUS FOR FORMING HOLLOW ARTICLES FROM ORGANIC PLASTIC MATERIAL

Enoch T. Ferngren, Little Neck, Long Island, N. Y., assignor to Plax Corporation, Hartford, Conn., a corporation of Delaware Application August 17, 1939, Serial No. 290,607

24 Claims. (Cl. 18—5)

This invention relates to a method of and an apparatus for forming hollow articles, such as bottles or other containers, from organic plastic material, and more particularly to such a method and apparatus by which articles of this type may be formed completely automatically and efficiently.

The process of forming hollow articles from organic plastic material was first patented by me on August 30, 1938, Patent No. 2,128,239. Various forms of a machine for forming hollow articles from organic plastic material are also disclosed in my copending application, Serial No. 198,646, filed March 29, 1938, and my joint application with one W. H. Kopitke, Serial No. 235,590, filed October 18, 1938, which is now Patent No. 2,175,054, granted October 3, 1939. Another machine for this purpose is disclosed in my copending application, Serial No. 224,001, filed August 10, 1938. The present application is a continuation in part of my said copending applications as to all common subject matter.

Among the objects of the present invention are to provide a novel method and apparatus for closing the leading end of an extruded tubular body of organic plastic material, which is in a moldable condition, adjacent to the orifice of an extrusion nozzle preparatory to the continued extrusion of the closed-ended tubular body, which is thereafter developed into the desired article.

A further object of the invention is to provide a novel method and apparatus for severing a completed tubular body or hollow article from the parent body of plastic material within an annular extrusion orifice by a cutting means acting upon the inside of the tubular body adjacent to the orifice of the extrusion nozzle, so that distortion of the finished article incident to the severing thereof from the parent body of plastic material is minimized.

A further object of the present invention is to provide for the forming of a tubular body or hollow article of organic plastic material contained within a mold by internally applied mechanical pressure, specifically by a combined rolling and ironing means effective on the inside of the hollow article or tubular body to be formed to roll and iron a selected portion of this body into a suitable cavity in the mold.

A further and more specific object of the present invention is to provide a method and an apparatus for severing a hollow article, such as a bottle or other container, from a parent body of plastic material within an extrusion nozzle and substantially simultaneously with this severance, for forming a lip upon the neck portion cf such severed article with a combined severing and lip-forming rolling means exerting pressure upon the inside of the neck portion of the article.

A further object of the present invention is to provide in an extrusion nozzle for extruding organic plastic material as a tubular body, wherein the organic plastic material is supplied to an annular chamber within an extrusion nozzle from one side thereof, for the even distribution of the plastic material around the annular chamber within the nozzle so that the extruded material may issue evenly from the orifice thereof.

A further object of the present invention is to provide apparatus for controlling the application of fluid pressure to the inside of a closed-ended hollow body of organic plastic material being extruded from a suitable nozzle as aforesaid for supplying a fluid pressure medium at a relatively low pressure during the extrusion of the closed-ended hollow body of plastic material from the nozzle to prevent the collapse thereof, while supplying the fluid pressure medium at a relatively higher pressure subsequent to the completion of the extrusion proper in order to expand the closed-ended hollow body previously extruded to conformity with a mold cavity. It is preferred that the valve controlling the application of pressure be of a particular character and so arranged as to be synchronized with the means exerting mechanical pressure upon the plastic material to force it from the nozzle and also so as to cut off flow of fluid pressure during the time period when plastic material is not being extruded from the nozzle, as for instance during the retractive stroke of an extrusion plunger.

Other and more specific objects of the present invention will become apparent from the following description and appended claims when taken in connection with the accompanying drawings, in which:

While the principles of my invention may be embodied in a more or less complicated, completely automatic, multi-unit machine, for example one which has a plurality of molds and but a single extrusion means and also in machines having a plurality of both molds and extrusion means, I have chosen for purposes of illustration to show an embodiment of the invention wherein there is but one mold and one extrusion means and wherein the timing is effected by a conventional type of timer, which has previously found favor in timing other types of automatic machinery.

Referring now to the accompanying drawings wherein there is illustrated a preferred embodiment of my invention, the machine comprises a stationary base member 1, which may be formed as a casting or built up from suitable plates welded or otherwise secured together in any desired manner. Mounted upon the base 1 is a pair of brackets 2, which may be constructed similarly to the base 1 and which serve to support certain of the mechanisms hereinafter set forth and also carry at their upper ends a table member 3, the parts being suitably secured together in any desired manner, for example by bolts as shown at 4, Fig. 5.

*Driving and timing means*

For driving and timing the various operating instrumentalities of the machine hereinafter to be described, there is employed a suitable source of power, such as an electric motor 5, mounted upon the table 3, and arranged to drive a timing shaft 6 through a speed reducing device generally indicated at 7, the speed reducing device being coupled to the shaft 6 through sprockets 8 and 9 and a sprocket chain 10. The speed of the shaft 6 is such that this shaft makes a single complete revolution for each mechanical cycle of the forming apparatus hereinafter to be described.

Mounted on the shaft 6 is a timing drum 11 of the same type as that used in the timer of the commercial "Hartford I. S." machine for forming glass bottles, this timer being particularly described in Ingle Patents Nos. 1,843,159 and 1,843,160, both granted February 2, 1932, and also in Patent No. 1,911,119, granted May 23, 1933. The drum 11 is provided with a plurality of undercut grooves in each of which one or more buttons may be arranged, there being preferably at least two buttons in each groove, one short button and one long button. The associated mechanism comprises a valve and its operating mechanism associated with each groove, the valves being contained within a valve chest generally indicated at 12. The parts are so constructed and arranged that when the valve actuating mechanism of each valve is engaged by the short button in the groove of the drum 11 opposite that mechanism, pressure is supplied from the main pneumatic pressure supply line through the valve to the associated operating mechanism, this pressure being continuously supplied until the long button in the same groove engages the valve operating mechanism. At this time presssure is cut off from the associated operating mechanism and the pressure in the line from the valve to that mechanism is exhausted to the atmosphere through the valve. The buttons are each adjustable universally around their associated grooves, so that any of the associated mechanisms may be supplied with pressure and pressure exhausted therefrom at any desired independently adjustable times in the cycle of the machine.

*Plasticating means*

Supported upon the table 3 is a casting 13 which contains the material measuring and extrusion means as hereinafter set forth. This casting carries a member 14 in which the organic plastic material may be plasticated by subjecting it to heat and pressure. The member 14 is provided with a bore or passage 15, generally cylindrical in contour, and with a plurality of annular chambers 16, 17 and 18 in the walls thereof through which temperature controlling media may be passed for controlling the temperature of the material during the plastication thereof. Secured to the upper end of the member 14 is a member 19 having therein a passage 20 aligned with the passage 15 and arranged to receive plastic material in granular form from a hopper forming portion 21 of the member 19. The member 19 carries at its upper end a fluid pressure cylinder 22 for actuating a pressing plunger 23, which is used in conjunction with the heat supplied from the chambers 16, 17 and 18 for supplying the necessary pressure to convert the substantially granular organic plastic material to a homogeneous plastic and moldable condition. The plunger 23 is shown as directly carried by a piston 24 in the cylinder 22, which is arranged to be moved in the cylinder by fluid pressure supplied to the opposite ends thereof through pipes 25 and 26. This fluid pressure may be pneumatic pressure directly supplied from the timer through the valves in the valve block 12, or may be hydraulic pressure supplied from a suitable source under the control of the timer. Organic plastic material in the form of a substantially granular molding powder, such as is now commercially available, may be supplied to the hopper portion 21 of the member 19 through a suitable pipe indicated at 27.

The construction just described is particularly adaptable for use with thermoplastic material, such for example as commercial cellulose acetate molding powder containing cellulose acetate and a suitable plasticizer. It is contemplated, however, that the construction might, with suitable changes as to the temperatures and pressures used, be employed for many other thermoplastic materials and also for some at least of the thermosetting materials which may be converted to a plastic and moldable condition by subjecting them to predetermined amounts of heat and pressure and which may later be converted to a hard and rigid state by the further application of heat thereto. I do not wish to be limited, therefore, as to the type of material to be employed in the device and/or according to the methods herein described.

*Material measuring and extrusion means*

The organic plastic material, after it has been converted to a plastic and moldable condition, is supplied to a measuring and extrusion means contained within the casting 13 and thence through a lateral passage 28 to an annular extrusion nozzle generally indicated at 29, and which will be described hereinafter. During its flow movement, the material is preferably controlled as to temperature in order that its viscosity and other properties dependent upon temperature may be controlled. For this purpose the casting 13 is provided with a plurality of chambers 30, which may be separate or interconnected as desired and which are supplied with temperature controlling fluid media in any suitable manner (not shown).

Figures 3, 7, 8, 9:
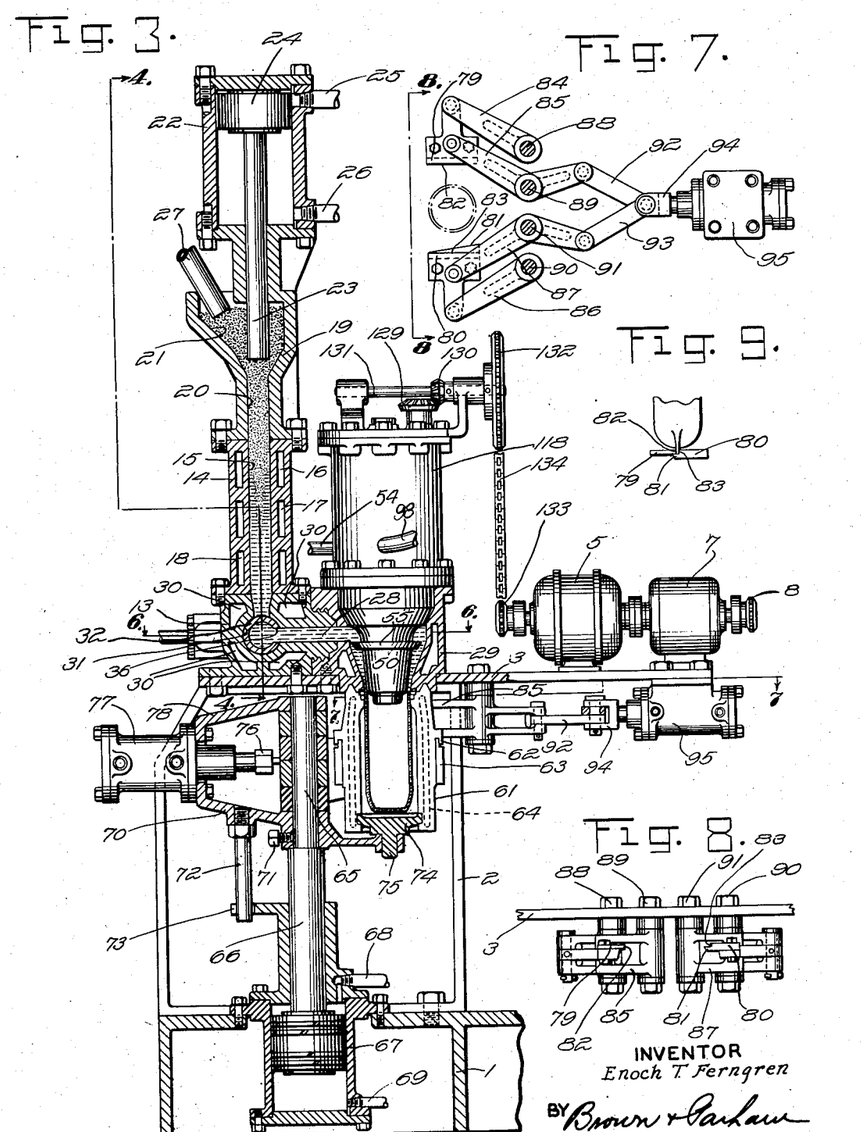
Fig. 3 is a view substantially in central vertical section of the machine taken along the line 3—3 of Fig. 1.
Fig. 7 is a detail view substantially in horizontal section along the line 7—7 of Fig. 3, showing the end closing means and the operating means therefor.
Fig. 8 is a view of the parts shown in Fig. 7, as seen from the left in that figure on the line 8—8.
Fig. 9 is a fragmentary detail view substantially in elevation showing the operation of the end closing and shearing means illustrated in Figs. 7 and 8.
Figures 4, 5, 6:
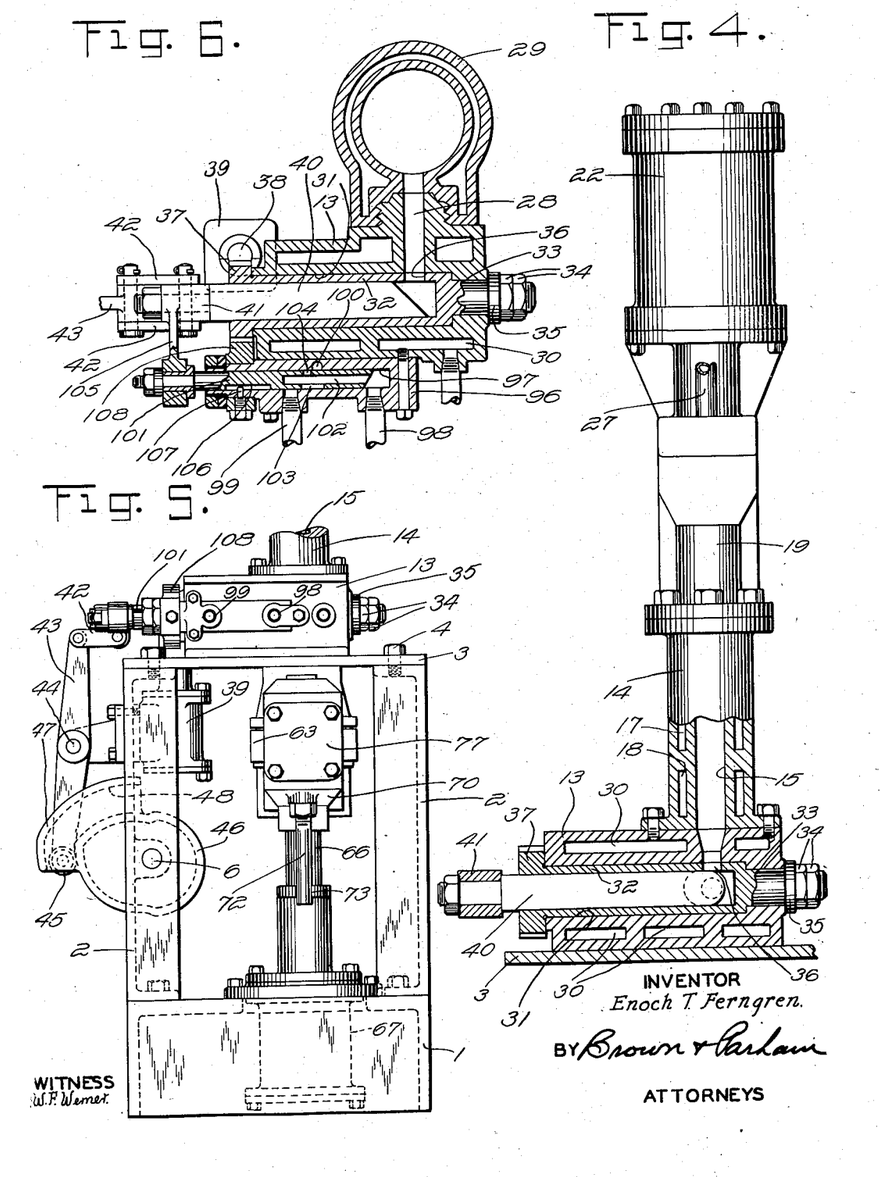
Fig. 4 is a view partly in elevation and partly in vertical section along the line 4—4 of Fig. 3, showing the plasticating means for the material and a portion of the measuring and extruding means, the latter being illustrated in section.
Fig. 5 is a view substantially in elevation of the device of Fig. 1, as seen from the left along the line 5—5 thereof, the upper portion of the mechanism being broken away and omitted.
Fig. 6 is a view substantially in horizontal section on the line 6—6 of Fig. 3, illustrating the plastic material measuring and extrusion means and the valve for controlling the flow of fluid pressure to the inside of a closed-ended hollow body of plastic material.

Formed within the casting 13 is a horizontally disposed cylindrical chamber or bore 31 within which is a rotatable sleeve member 32. The bore 31 does not extend all the way through the casting 13 as best shown in Fig. 6, but aligned therewith is a smaller bore 33 arranged to receive a solid stud portion integral with the sleeve 32. The outer end of this stud portion is threaded to receive a pair of lock nuts 34 which are separated from the adjacent wall of the casting 13 by a washer 35. By this construction the sleeve 32 is prevented from dislodgment from the position shown, while rotation thereof about its longitudinal axis is permitted. The sleeve member 31 has a single aperture 36 therein adapted upon the rotation of the sleeve alternately to register with the inlet passage communicating with the bore 15 of the plasticating device and with the outlet passage 28, as shown in Figs. 3, 4 and 6. Thus, the sleeve 32 serves by its rotation to act as a valve for the inlet and outlet passages respectively of the measuring chamber, which comprises the space within the sleeve 32. The sleeve 32 carries integral or rigid with its open end a pinion 37 which is in mesh with a vertically extending rack 38 formed on or rigid with the piston rod of a pneumatic cylinder 39, Fig. 5. Pressure to the opposite ends of this cylinder will be supplied as aforesaid from the timer including the drum 11 and the valve block 12.

Arranged for axial movement within the sleeve 32 is an extrusion plunger 40, which acts to measure and later to extrude predetermined quantities of plastic material into and through the extrusion nozzle 29. When the aperture 36 is directed vertically upwardly in alignment with the bore 15, as shown in Fig. 4, and the plunger 40 is retracted, plastic material will be supplied into the interior of the sleeve 32, the amount of this material being measured by the space within the sleeve 32 vacated by the plunger upon its retraction. Subsequent to the completion of the retractive stroke of the plunger 40, the sleeve 32 is rotated through an angle of 90° by the cylinder 39; and the plunger 40 is moved forwardly to expel the plastic material from the interior of the sleeve 32 through the aperture 36 and the passage 28 into and through the extrusion nozzle 29. It is contemplated that the amount of material thus forced into and through the extrusion nozzle by each stroke of the plunger 40 will be the same as that used in the making of a single article, so that the plunger 40 will make a single complete reciprocation for each article made. In this way also the plastic material is forced to and through the extrusion nozzle 29 at a pressure independent of any pressure used thereon in plasticating it and is supplied thereto by the plunger 40 at a speed which may be controlled and varied in different parts of the plunger stroke in accordance with the particular requirements for the extrusion of a given article.

For moving the plunger 40, it is provided at its rear end with a suitable collar 41 which is connected by a pair of links 42 to the upper end of a rocking lever 43 pivoted at 44 to suitable brackets extending from one of the members 2. At its lower end the lever 43 carries a cam roller 45 arranged to engage the outer periphery of a cam 46 which is mounted upon the shaft 6. The cam 46 also carries an outer flange portion 47 providing a short closed cam track section 48, serving positively to retract the plunger 40, forward movement of the plunger being controlled by the unguarded periphery of the cam 46. Thus, as the shaft 6 makes a single revolution during each mechanical cycle of the machine, the plunger 40 will be given one complete reciprocatory movement for each revolution of the shaft 6 and of the cam 46; and, further, the speed of extrusion may be varied in any desired manner under the control of the shape of the cam 46. The cam 46 is preferably made interchangeable to provide for the making of articles of different sizes or shapes.

The compression stroke of the plunger 23 in initially plasticating the material is started during the time the sleeve 32 is at the position shown in Fig. 3 closing the exit from the plasticating chamber. After the sleeve 32 is rotated to the Fig. 4 position, the plunger 23 is still moving downwardly to provide the pressure on the plastic material to force it into the interior of the sleeve 32 upon the retractive stroke of the plunger 40.

*Extrusion nozzle and plastic material supply therethrough*

Figure 10:
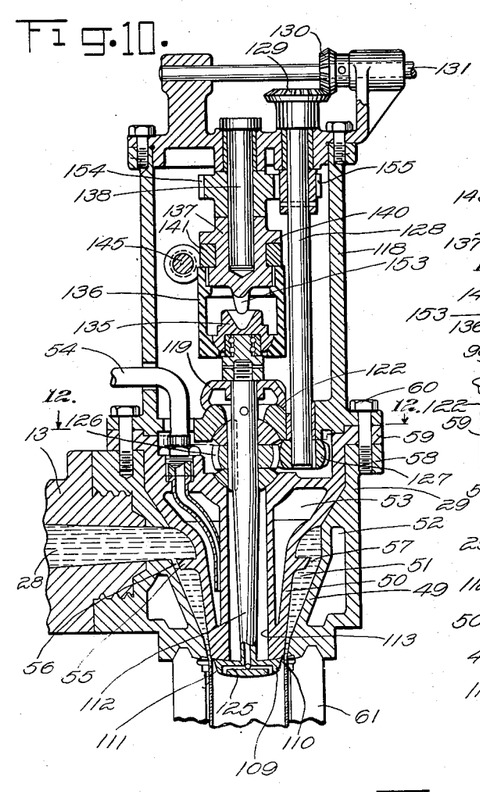
Fig. 10 is a fragmentary view substantially in vertical section on the line 10—10 of Fig. 1, illustrating the interior construction of the nozzle and the shearing and neck forming means, the latter being in its inoperative position.
Figure 11:
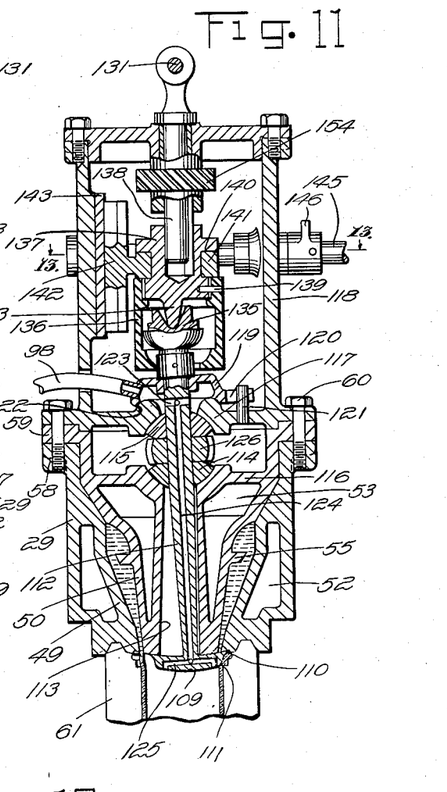
Fig. 11 is a view similar to that of Fig. 10, but at right angles thereto and taken substantially on the line 11—11 of Fig. 1.
Figures 12, 13:
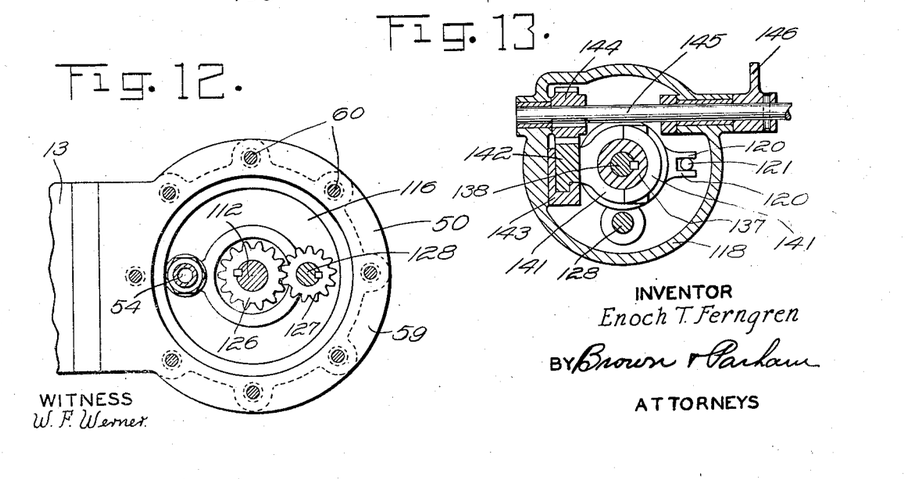
Fig. 12 is a detail view substantially in horizontal section on the line 12—12 of Fig. 10, certain apparatus being omitted for clearness.
Fig. 13 is a detail view in horizontal section taken substantially on the line 13—13 of Fig. 11.

The extrusion nozzle 29 is best illustrated in Figs. 10 and 11 and comprises an outer nozzle member 49 and an inner nozzle member 50, which are spaced apart to provide an annular space 51 therebetween communicating at one side with the inlet passage 28 for plastic material. Both nozzle members are provided with temperature controlling chambers for controlling the temperature, and, hence, the viscosity of the plastic material during its passage through the nozzle. For this purpose, the outer nozzle member is provided with a chamber 52 and the inner nozzle member with a chamber 53, through each of which temperature controlling fluid may be passed by suitable conduits, one of which is shown at 54, Fig. 10.

In order that the plastic material issuing from the nozzle may be uniformly extruded to provide a uniform tubular body, which is somewhat difficult in view of the feeding of plastic material to the chamber 51 from one side, there is provided a partial baffle within the chamber 51, which is eccentrically disposed so as to constrict the passage between the upper and lower portions of this chamber to a greater extent adjacent to the entrance of the passage 28 thereto and to a progressively lesser extent toward the opposite side. As shown, this baffle is formed as a rib 55 which may be integral with the inner nozzle member 50 and extends outwardly therefrom to provide a relatively restricted passage at 56 between the upper and lower portions of the chamber 51 and a relatively wide passage at 57 on the opposite side, as shown in Fig. 10. The passage widths between the rib 55 and the outer nozzle member, as shown in Fig. 11, are substantially uniform as this view is taken at right angles to that of Fig. 10.

The outer nozzle member is provided with a flange 58 at its upper end and the inner nozzle member with a similar flange 59, these flanges being secured together by bolts 60.

Molds—Mounting and operating means therefor

Associated with the nozzle 29 in the forming of articles is a mold generally indicated at 61, this mold being preferably formed of removable and interchangeable mating portions, each of which is supported on a suitable mold holder, as for example by providing the mating portions or halves of the mold with bracket-shaped extensions as shown at 62, which are arranged to engage over suitable flanges on mold holders 63. Each of the portions of the body mold is shown provided with a temperature controlling chamber therein, one of which is indicated in dotted lines at 64. Suitable temperature controlling fluid may be passed to and from these chambers through pipes (not shown). The mold holders 63 are pivoted upon a vertical axis pintle 65, which is formed as the upper end of the piston rod 66 of a pneumatic cylinder 67 mounted in the base 1, as best shown in Fig. 3. In this way the mold is mounted for opening and closing movement and for vertical movement toward and away from the orifice of the nozzle 29.

For moving the mold vertically fluid pressure may be conducted to the opposite ends of the cylinder 67 through pipes 68 and 69 from the timer, including the drum 11 and the valve box 12. Angular movement of the mold about the axis of the piston rod 66 during this vertical movement is prevented by the provision of a bracket 70 secured to the piston rod 66 by a set screw 71 and carrying a vertically depending stud 72, which is arranged to pass through a bore or notched portion 73 formed in a laterally extending bracket carried by the head of the cylinder 67.

The bracket 70 also carries a bottom plate 74 for the mold, which is removably supported thereby, in the present instance by providing the bottom plate with a stud 75 extending downwardly through a suitable aperture in the arm of the bracket 70 extending beneath the mold 61.

For opening and closing the mold 61, the mold holders 63 thereof are connected by suitable pivoted links (not shown) to a cross head 76 carried by the piston rod associated with a pneumatic cylinder 77 which is supported by the bracket 70 and by a bracket 78 secured to the upper end of the pintle 65 and thus is movable vertically with the mold 61. Fluid pressure is conducted to the opposite ends of the cylinder 77 from the timer in a well known manner, certain flexible tubing being used where necessary in connection with the cylinder 77 and with the supply of temperature controlling fluid to the chambers 64 of the mold in order to permit of the movements of these parts.

The mold is locked in its closed operative position shown in Fig. 3 by upper flanges thereof seating in an annular groove formed in the lower face of the extrusion nozzle 29.

End closing and shearing means

As a preliminary step to the making of bottles or other containers, it has been found desirable, if not absolutely necessary, to close the end of the tubular body of plastic material adjacent to the orifice of the annular extrusion nozzle and thereafter to extrude the material from the nozzle as a closed-ended hollow tubular body, which body is subsequently expanded in the mold. The present invention provides novel means for shearing off a portion at the end of an extruded open-ended tubular body and for closing this end. The shearing is usually necessary as the open end of the tubular body extending from the orifice may be somewhat irregular after the preceding article has been severed therefrom. It is therefore desirable to shear off a portion of the tubular body including this irregularity and including such portion of the material as may have been rigidified to an undesired extent from the point of view of the making of the next succeeding article. This shearing operation is preferably immediately followed or accompanied by an end closing operation as aforesaid.

For effecting this purpose according to the present invention, there is provided a combined shearing and end closing means, which in the present instance includes a pair of cooperating members 79 and 80, Figs. 7 to 9, these members serving both to shear an undesired portion of plastic material from the end of the tubular body and to squeeze together a portion of the tubular body on the side of the shear line toward the extrusion nozzle, so that the material may weld itself together in a seam shaped somewhat as the bottom of a collapsible metallic tube. For this purpose, the member 79 has a lower face terminating in a sharp edge which cooperates with an inclined shearing portion 81 of the member 80 to effect the shearing of the material. In addition to this, the forward face 82 of the member 79 is arranged parallel with a face 83 of the member 80, so that when the members 79 and 80 are brought together, the faces 82 and 83 will be brought into squeezing relation with the lower end of the tubular body used in forming an article, as particularly shown in Fig. 9, to squeeze the opposite sides thereof together without, however, shearing the material at this point. Due to the moldable character of the material at this time in the process, it will weld to itself so as to form a closed end for the tubular body subsequently to be extruded from the orifice of the nozzle 29, the faces 82 and 83 approaching each other, but never being brought closer than substantially the position shown in Fig. 9.

The members 79 and 80 are arranged for parallel motion, as particularly shown in Fig. 7, by being mounted upon pairs of pivoted arms 84 and 85 for the member 79 and 86 and 87 for the member 80. All these arms are of the same length from their pivot points 88, 89, 90 and 91 respectively, so that the members 79 and 80 will be parallel at all times. The arms 85 and 87 are formed as portions of bell crank levers pivoted respectively at the pivot points 89 and 91 and have their rear ends connected by links 92 and 93 with a fitting 94 secured to the piston rod of a pneumatic cylinder 95. Pressure may be conducted at suitable times to the cylinder 95 from the timer, including the drum 11 and the valve box 12.

While the shearing and squeezing means are here shown as combined together, it is contemplated that these means could be separated if desired as long as the result is substantially the same. The combining of these means, however, results in a simpler mechanism than can otherwise be provided.

*Fluid pressure control for forming articles*

During the extrusion of a hollow body of plastic material as aforesaid, it is desired that a fluid pressure medium, usually air or other gaseous medium, at a relatively low pressure, be supplied to the interior of the extruding closed-ended body to prevent the collapse thereof. Subsequent to the completion of the extrusion, or at about the time the extrusion is completed, the fluid pressure is supplied to the interior of the hollow body to expand it to conformity with the mold, which has meanwhile closed about the extruded hollow body and then elevated to the position of Fig. 3. It is also preferred that means be provided for preventing the supplying of pressure through the nozzle during the retractive stroke of the extrusion plunger 40.

All these results are effected by mechanism provided in accordance with the present invention, this mechanism including a valve generally indicated at 96, Fig. 6, including a cylindrical bore 97 which communicates through a pipe 98 with the nozzle, Figs. 6 and 11. The passage from the pipe 98 to the interior of an article being blown will be described hereinafter in describing the construction and operation of the nozzle and associated parts, particularly the shearing and end-forming means. Communicating also with the bore 97 is a port to which is connected a low pressure pipe 99 and a port 100 for high pressure, these ports being in the same plane, which in this instance is a horizontal plane. It will be understood that low and high pressure are supplied to the valve 96 from suitable sources (not shown). Located within the bore 97 and arranged for both axial and rotary movements therein is a valve member 101, which has its inner end portion hollow, as shown at 102, as an open-ended tube. This tubular portion has a port 103 therein arranged at times to register with the low pressure port from the pipe 99, and also has a port 104 arranged at times to register with the high pressure port 100.

At the start of the extrusion of a hollow body of organic plastic material under control of the extrusion plunger 40, the valve member 101 is at its left-hand position with the port 103 partly in registry with the port communicating with low pressure pipe 99. Thus at this time low pressure is admitted from the pipe 99 through the port 103 to the hollow space 102 of the plunger and thence through the pipe 98 to the interior of a closed-ended hollow body of plastic material. The valve member 101 is mechanically connected to the plunger 40 by an arm 105 carried by the latter, which loosely engages a collar on the valve member 101 so that both plungers move together longitudinally. This movement is limited by the dimensions of a longitudinal slot 106 in the valve member 101, which is arranged to receive a pin 107, the latter having no longitudinal movement. As the valve member 101 moves to the right, as seen in Fig. 6, during the extrusion of a closed-ended hollow body of plastic material from the nozzle, the port 103 first passes out of registry with the port communicating with the pipe 99, so as to cut off flow of low pressure to the inside of the hollow article. This is the position shown in Fig. 6. As the movement is continued, the port 104 comes into registry with the port 100, so as to permit high pressure to flow through these ports and the pipe 98 to the interior of an article to expand it into conformity with the mold. This occurs at substantially the end of the stroke of the plunger 40 from left to right, as seen in Fig. 6.

When it is desired to cut off the expanding pressure at the termination of the expansion, the valve member 101 is rotated to a position at an angle to that in which it is shown in Fig. 6. This is effected by the means used for rotating the sleeve 32, namely, the fluid pressure cylinder 39, the rack 38 and the pinion 37. Meshing with the pinion 37 and arranged for movement about a projecting portion of the casing of the valve 96 is a part pinion 108, which carries the pin 107, the latter passing through a circumferentially disposed slot in the casing of the valve 96 and extending into the groove 106. Thus, when the part pinion 108 is rotated, the pin 107 engaging the groove 106 will rotate the valve member 101 so as to bring the ports 103 and 104 out of the plane of the ports 100 and 99, the valve member 101 being swivelly connected to the end of the arm 105 to permit this movement. Thus, on the retractive stroke of the plunger 40, the valve member 101 is similarly retracted by the arm 105, but as the ports 103 and 104 are masked from the pipe 99 and the port 100, no pressure will be supplied to the nozzle at this time.

*Article severing and forming means*

After an article has been fabricated, as hereinabove set forth, while still integral with the parent body of organic plastic material within the nozzle and has been expanded to conformity with the cavity of the mold and at least partly rigidified therein, the material forming the article must be severed from the material within the nozzle. Various means have been proposed for effecting this purpose, as set forth for example in my aforesaid earlier applications. The present invention provides a new and advantageous means and method for solving this problem by the use of internally applied force, and particularly by an internal shearing means which is preferably formed as a disc cutter and moved progressively to engage the circumference of the portion of the article to be sheared. Particularly it is preferred that this cutter be revolved in a positive manner and by a means that will cause the rotation of the cutter at a speed different from that of the movement of the point of engagement thereof with the material around the circumference of the latter, thus providing a desired shearing action upon the material.

In carrying out another feature of the invention, namely, that of internally forming a selected portion of an article, there is shown for use the same structure used for the cutter, or more particularly a part of this same structure. It will be understood, however, that these two functions may in fact be separate and distinct from each other and means for performing either one alone may be employed without necessarily including the means for the other, even though both are shown combined in the means shown in the drawings and hereinafter particularly described. This forming means or forming implement is preferably of such contour as would be generated by a radial cross section shape thereof revolved around the axis of the cutter, or in other words, it is circular in any transverse cross section in a plane perpendicular to its axis. Furthermore, while the device or implement is shown as being used in the present instance for forming a finished lip portion on the article, it is contemplated that any selected portion of a tubular article, whether such article has a closed bottom end or not, might be formed by a mechanical rolling or ironing means based upon the same principles as that herein shown and described and might be operated by the same or some equivalent mechanism.

When utilizing a cutter and/or former, as hereinabove discussed, which is arranged to engage the inside of a tubular body of plastic material which has been extruded from an orifice, it is necessary that the implement, whatever be its nature, be movable to some position during the extrusion of the tubular body from the orifice that it will not interfere with this extrusion. This position is preferably central of the orifice of the extrusion nozzle, where the implement, which may be continuously rotated, will be out of line with the path of extrusion of the tubular body of plastic material. Means are hereby provided for effecting this purpose.

Turning now particularly to the drawings, Figs. 10 to 13 inclusive, there is provided a combined shearing and shaping implement 109. This implement has at its outer periphery a shearing edge 110 and is formed therebeneath with a forming surface 111, the latter being arranged to form the plastic material to the shape shown at the right in Fig. 11 by a combined bodily rotary movement substantially about the axis of the tubular body of plastic material and a rotative movement about the axis of the implement 109. The relative speeds of these two movements are preferably such that there will be a combined shearing and ironing action upon the plastic material in engagement with the implement.

The implement 109 is mounted upon the lower end of a shaft 112, which passes through a downwardly tapered aperture 113 in the inner nozzle member 50 and has secured thereto a pair of semi-spherical members 114 and 115, the former being seated in a semi-spherical seat formed within an upper web portion 116 of the inner nozzle member 50 and the latter being received within a similar semi-spherical seat formed within a lower web portion 117 of a tubular housing 118, which is secured to the flanges 58 and 59 of the nozzle by the bolts 60, the semi-spherical portions 114 and 115 and their seats being positioned about a common center so as to form a ball and socket joint for movement of the shaft 112. This mounting permits both the rotation of the shaft 112 about its own axis and the additional movement thereof about the center of the semi-spherical portions 114 and 115, so that the implement 109 may perform the functions above described. Due to the fact that the center point of this ball and socket joint is spaced a substantial distance longitudinally of the shaft 112 from the implement 109, the shaft 112 may be considered as substantially parallel with the longitudinal axis of the tubular body of plastic material extruded from the nozzle.

Above the web portion 117, there is located around the shaft 112 a collar member 119, which is prevented from rotary movement with the shaft 112 about its own axis by the provision of a pair of ears 120 arranged to straddle a fixed pin 121 secured in the web 117. The underside of the collar member 119 is hollowed out at the center; and at its periphery is arranged to engage a rounded surface 122 of the web 117 to form a substantially air-tight connection at this point independently of the several movements of the shaft 112. The pipe 98 leads to the interior of the collar member 119 and supplies pressure to the interior thereof. This pressure passes thence through one or more lateral bores 123 in the shaft 112 into the interior of the shaft, thence through a longitudinal bore 124, and thence to the interior of the implement 109, which is provided with a plurality of bores 125 opening to the underside thereof. Pressure may thus be communicated to the interior of a body of plastic material depending from the orifice of the nozzle at any time independent of the position or movements of the implement 109.

Means are provided for rotating the shaft 112 and the implement 109 carried thereby about the axis of this shaft. For this purpose, the shaft 112 is provided intermediate the members 114 and 115 with a gear member 126, the teeth of which are curved about the center of movement of the shaft in the ball and socket joint. Meshing at all times with the gear 126 is a gear 127 having somewhat similarly shaped teeth, the gear 127 being mounted on the lower end of a vertical shaft 128, which is journaled in suitable bearings in the housing 118 at the upper and lower ends thereof. At its upper end the shaft 128 carries a beveled gear 129 meshing with a beveled gear 130 mounted upon a horizontal shaft 131, which is journaled in suitable bearings in brackets extending upwardly from the head of the housing 118. The shaft 131 is provided with a suitable sprocket wheel 132 which may be driven from any suitable source of power, here shown as a sprocket 133, mounted upon the shaft of the motor 5, the drive being effected through a sprocket chain 134. The shaft 112 will thus be driven continuously during all the time the motor 5 is operating through the connections just described.

Figure 1:
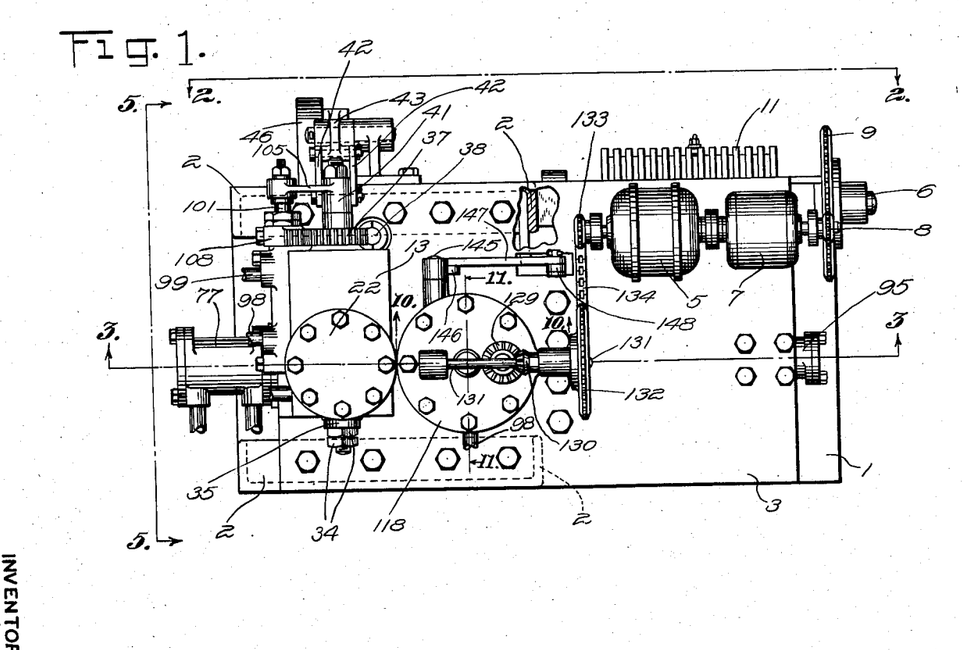
Figure 1 is a plan view of a single unit machine embodying the present invention.
Figure 2:
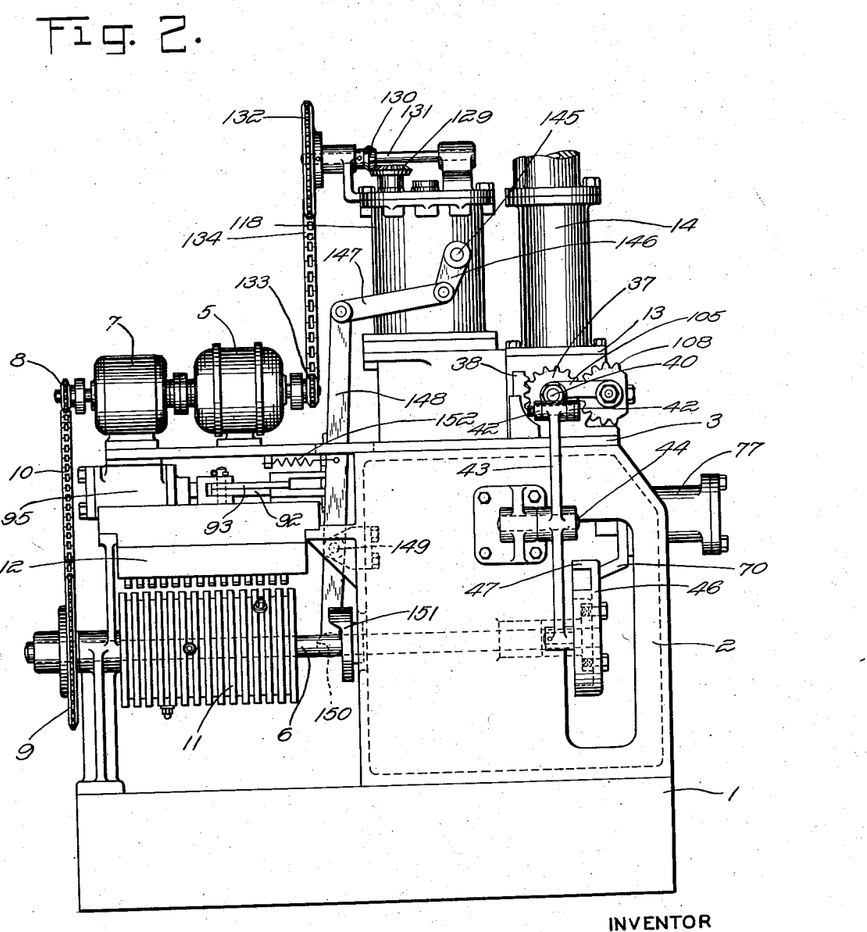
Fig. 2 is a rear elevation of the machine of Fig. 1 taken along the line 2—2 of that figure and having an upper portion broken away.

Means are provided for moving the shaft 112 about the center of the ball and socket joint previously described when desired and for holding this shaft in a central inoperative position axial of the nozzle and of the tubular body of plastic material being extruded therefrom when this operation is desired. For this purpose, the upper end of the shaft 112 has mounted thereon a socket member 135 which is arranged for rotary movement in respect to the shaft 112 by the provision of a suitable bearing, as shown in detail in Fig. 10. The lower outer portion of the socket member 135 is rounded, as shown in Figs. 10 and 11, and is arranged to be engaged within a correspondingly shaped portion of a housing 136 secured to a head 137, the latter being vertically slidable on and splined to a vertical shaft 138 journaled in the upper head of the housing 118. The socket member 135 and the housing 136 thus form a clutch for the shaft 112. The housing 136 is arranged for vertical movement between an upper position, shown in Fig. 10, at which it engages the lower outer periphery of the socket member 135, to constrict the shaft 112 to a vertical position without stopping the rotation of the shaft, and a lower position where it frees the socket member 135 to permit the movement of the shaft 112 about the center of the ball and socket joint, as shown in Fig. 11. For moving the housing 136 between these two positions, the head 137 to which it is secured by a pin 139, Fig. 11, is provided with an annular groove 140 in which is rotatably received an annular collar 141 carried by a vertically slidable member 142, the latter being guided in a suitable guide 143, Fig. 13, which is secured to the housing 118 and is held in engagement with this guide by the engagement of a pinion 144 with rack teeth on the side of the member 142 opposite that in engagement with the guide 143. The pinion 144 is mounted on a transverse shaft 145 which is journaled in suitable bearings in the housing 118 and carries outside this housing a crank lever 146, Figs. 2, 11 and 13. The crank lever 146 is connected at its outer end through a link 147 with the upper end of a lever 148 which is pivoted at 149 to a suitable part of one of the members 2. At its lower end the lever 148 carries a cam roller 150 in engagement with a cam 151 secured to the shaft 6. A suitable tension spring 152 extends between a portion of the lever 148 and a suitable anchorage, shown as a pin depending from the table 3, Fig. 2, the spring retaining the cam roller 150 at all times in engagement with the cam 151. By the means described the cam 151 operates through the lever 148, the link 147, the crank lever 146 and the shaft 145 to rotate the pinion 144. This in turn controls the vertical position of the slide 142 due to the pinion 144 engaging the rack teeth on one side of this slide. This slide through the collar 141 controls the vertical position of the head 137 and hence that of the housing 136.

Means are provided for moving the shaft 112 about the center point of the ball and socket bearing therefor in a sort of wobble movement, comprising an eccentric pin 153 secured to the underside of the head 137 and arranged to extend into a depression in the head of the socket member 135. When the head 137 is moved to its lowermost position by the means just described, the pin 153 will enter the reentrant portion or depression in the top of the socket member 135, as shown in Fig. 11. The head 137 is continuously rotated so that when the pin 153 is in engagement with the socket member 135, there is provided a desired wobble movement for the shaft 112 about the center of the ball and socket joint to cause the point of engagement of the implement 109 and the plastic material to move around the circumference of the plastic material engaged thereby. For rotating the head 137, it is splined to the shaft 138 which is given a positive and continuous rotation by the provision of a gear 154 secured to the shaft and arranged to be driven by a pinion 155 secured to the shaft 128, which is continuously rotated as above set forth.

Inasmuch as the pinion 155 is substantially smaller than the gear 154 and as the pinions 127 and 126 have subtantially the same pitch diameter, the angular velocity of the head 137 will be less than the angular velocity of the shaft 112 for any given velocity of the shaft 128. Thus, the rate at which the implement 109 moves about the circumference of an article will be substantially less than the rate of rotation of this implement, so as to provide a shearing action between the edge 110 and the material, particularly in cooperation with the lower end of the outer nozzle member 49 on the one hand and to provide a combined rolling and ironing movement between the forming surface 111 of the implement 109 and the organic plastic material in shaping a portion thereof into a selected portion of the mold, in this case into the neck portion to form a finished neck for an article.

*Conclusion*

While there is shown in the accompanying drawings and hereinabove described but one embodiment of the present invention, it will be obvious to those skilled in the art that the principles thereof may be embodied in many other types of structures and that the methods of operation herein decribed are susceptible of performance by other types of structures. I do not wish to be limited, therefore, except by the scope of the appended claims, which are to be construed a broadly as the state of the prior art permits.

I claim:

1. The method of forming a hollow article from organic plastic material, comprising extruding a hollow tubular body portion of such material in a plastic and moldable condition from an annular extrusion orifice, closing the end of the extruded portion of material by positively applying uniform pressure to predetermined areas on opposite sides thereof to weld such areas together, and severing a portion of the extruded material along a shear line disposed at the boundary of said area distant from the extrusion orifice.

2. Apparatus for severing a tubular extruded body of organic plastic material from the parent body of said material within an extrusion nozzle, comprising a circular cutting means arranged to be rotatable about an axis substantially parallel with the axis of said nozzle, means for bodily moving said cutting means between an inoperative position in which its axis is so disposed that it will be substantially in alignment with and within a tubular body of plastic material being extruded from said nozzle to permit the uninterrupted extrusion thereof and an operative position in which its axis is positioned further from the axis of said nozzle so that said cutting means is in contact with the wall of the tubular body to be severed, an outer orifice-defining wall forming a part of said nozzle and so positioned in respect to said circular cutting means as to cooperate therewith in shearing a tubular extruded body of plastic material, and means effective during the severing operation for moving the center of said circular cutting means in a path substantially concentric with the tubular body to be severed and such that said cutting means travels progressively around the circumference of the tubular body to sever it from the parent body of plastic material within said nozzle with a minimum of distortion.

3. Apparatus in accordance with claim 2, comprising means for positively rotating said circular cutting means about its own axis during the severing operation.

4. Apparatus in accordance with claim 2, comprising means for positively rotating said circular means about its own axis during the severing operation at a speed different from the speed of rotation of said axis about the axis of said nozzle.

5. The method of forming an annular portion of a tubular body of organic plastic material to a desired shape while the material of the body is in a moldable condition, comprising supporting such a tubular body of plastic material in a mold having a forming cavity of the desired configuration, forming a selected portion of said tubular body in said mold by bringing a continuously rotating forming tool into engagement with the inside of said portion to force such portion of the plastic material into the cavity of the mold by moving the center of the rotating forming tool in a path to cause it to engage and form the plastic material progressively about the interior of the portion to be formed, positively rotating the forming tool about its own axis at a speed such that the peripheral speed of the portion of the forming tool in contact with the plastic material is different from the speed of movement of the point of engagement of the forming tool with the plastic wall engaged thereby.

6. The method of severing an extruded tubular body of organic plastic material from the parent body of said material within an extrusion nozzle including an outer orifice-defining wall and of forming a finished neck portion upon the severed body of plastic material, comprising cutting through the connecting wall of plastic material adjacent to the orifice of said extrusion nozzle by a rotatable cutting and forming tool engaging the inside of the tubular body and cooperating with the outer orifice-defining wall of said nozzle to shear the plastic material, moving the center of said rotatable cutting and forming tool in a path concentric with the tubular wall to be severed so as to cause the cutting and forming tool to follow progressively around the circumference of the tubular body during the cutting thereof, supporting the tubular body during the cutting and neck-forming in a mold having a neck-forming cavity, and forcing a portion of the tubular body into said neck-forming cavity by said cutting and forming tool during the concentric and rotary movements thereof to form a finished neck portion on the tubular body of plastic material in the neck-forming cavity of said mold.

7. The method according to claim 6, including the additional step of positively rotating said cutting and forming tool at a speed such that the peripheral speed thereof will be greater than the speed of movement of the point of engagement of said tool with the plastic material in contact therewith incident to the movement of the axis of said tool.

8. The process of forming a hollow article having a shaped lip thereon from organic plastic material, which comprises the steps of confining a body of such material in a plastic and moldable condition within an annular extrusion nozzle, forming an end-closing portion on the leading end of such material adjacent to the orifice of said nozzle, thereafter extruding the material from the nozzle as a closed-ended hollow tubular body, receiving such body in a mold shaped to form the desired article, suppling fluid pressure to the inside of said closed-ended body through the inside of said nozzle to expand said body to conformity with the cavity of said mold, while still retaining the material forming the article in said mold integral with the parent body of organic plastic material within said nozzle, severing the material forming the article in such mold from the parent body of material within said nozzle by bringing a rotatable cutting and forming tool into engagement with the inside of the neck portion of said article at the orifice of said nozzle, moving said tool concentrically with the neck portion of said article while rotating said tool to cause it to sever the material forming the article from the parent body of material within said nozzle and to cause a forming portion of said tool to roll and iron the lip portion of the severed article into a lip-forming cavity in said mold.

9. Apparatus for closing the end of a tubular body of organic plastic material in forming articles therefrom while the material is in a moldable condition, comprising cooperating pressing members movable to approach to a predetermined distance only of each other and arranged to engage opposite sides of such tubular body and positively squeeze them together to cause a welding of the material, cooperating shearing means mounted for movement past each other in shearing relation for cutting excess plastic material from that forming the body of the desired article, and means for operating said pressing members and said shearing means to move toward and past each other respectively to close and weld the end of a tubular body of plastic material and to shear excess plastic material therefrom.

10. Apparatus for closing the end of a tubular body of organic plastic material in forming an article therefrom while the material is in a plastic and moldable condition, comprising pressing members mounted for movement toward and from each other to engage opposite sides of such body and to squeeze them together positively to cause a welding of the material, a shearing means rigid with one of said pressing members and cooperating with and movable past a shearing edge on the other of said pressing members for shearing excess plastic material from the body thereof used to form the article at the outer boundary of the welded area, and means for operating said cooperating means to cause them to approach and withdraw from each other in substantially rectilinear paths for closing and welding the ends of tubular articles to form an end-closing portion therefor and for shearing excess material therefrom.

11. Apparatus for closing the end of a tubular body of organic plastic material in forming an article therefrom while the material is in a plastic and moldable condition, comprising cooperating members each including a shearing portion and a pressing portion rigid therewith, said members being so constructed and arranged that during the movement from open to closed position thereof, said shearing portions pass one another to sever a tubular body of plastic material therebetween, and at the closed position of said members, the pressing portions thereof will be in a predetermined spaced relation so as to squeeze therebetween the end of the tubular body of plastic material to cause a welding of the squeezed portions to form an end-closing portion for the tubular body, and means to move said members toward and away from one another.

12. Apparatus for shearing a tubular extruded body of organic plastic material from a parent body of said material within an annular extrusion nozzle, comprising a rotatable circular cutter disposed inside said tubular body of plastic material adjacent to the orifice of said nozzle, stationary means outside said tubular body of plastic material cooperating with said cutter in shearing said plastic material, a shaft upon which said cutter is mounted and which is arranged substantially parallel with the axis of said extrusion nozzle, means mounting said shaft to permit the bodily movement of said cutter substantially concentrically with said nozzle so that said cutter may be moved into engagement with the tubular body of plastic material being extruded, means for moving said shaft to move said cutter circumferentially about the interior of said tubular body so as to cause it to shear the tubular body of plastic material by a substantially radially outwardly directed force, tending to minimize the distortion of the tubular body of plastic material incident to the shearing thereof, and other means for continuously rotating said shaft and said cutter about the axis of said shaft.

13. Apparatus for forming shaped articles from organic plastic material, comprising an annular extrusion nozzle, means for extruding plastic material from said nozzle as a tubular body, forming means disposed within said tubular body and supported from said nozzle for forming the tubular body of plastic material by applying force thereto from the inside, a mold within which a portion at least of said tubular body is adapted to be contained during the forming thereof, and means to move said forming means to cause it to engage and form said tubular body of material within said mold by a substantially radially outwardly directed force applied to said tubular body of plastic material to force it into conformity with the interior of a corresponding portion of said mold.

14. Apparatus in accordance with claim 13, wherein said forming means comprises a rotatable forming member, a shaft upon which said rotatable forming member is mounted, and means for rotating said shaft about its own axis to rotate said forming member while the latter is in contact with and forming a tubular body of plastic material.

15. Apparatus for forming hollow articles from organic plastic material, comprising an annular extrusion nozzle through which the material is adapted to be extruded as a tubular body, means for extruding the organic plastic material through said nozzle in a plastic and moldable condition, a mold arranged to receive a hollow body of plastic material extruded from said nozzle and having a neck forming portion at the end thereof adjacent to the orifice of said nozzle, a combined shearing and neck-forming means supported from said nozzle inside a tubular body of plastic material extruded therefrom arranged to engage the inside of such tubular body to shear it from the parent body of plastic material remaining within said nozzle after said tubular body has been enclosed within said mold, and also to form a portion of such tubular body into the neck forming portion of said mold, and means to move said combined shearing and forming means to cause it to shear and form the inside of a tubular body of plastic material by a substantially outwardly directed force, so as to minimize the distortion of the tubular body incident to the shearing and to form the end thereof into the desired shape within said mold.

16. Apparatus for forming hollow articles from organic plastic material, comprising an annular nozzle through which the plastic material is extruded in tubular form, a material-working implement disposed inside the tubular body of plastic material extruded from said nozzle, a shaft carrying said implement arranged within and generally parallel to the axis of said tubular body, means for supporting said shaft for movement about a point spaced a substantial distance longitudinal of said shaft from said implement, means for moving said shaft about said point to cause said implement progressively to engage the entire inner circumference of said tubular body, and means to move said shaft to a central position such that said implement is out of the path of the extrusion of said tubular body during the extrusion thereof.

17. Apparatus in accordance with claim 16, wherein said implement has a form generated by the rotation of a radial section thereof about the axis of said shaft, and wherein additional means are provided for rotating said shaft about its own axis for rotating said implement during its engagement with said tubular body of plastic material.

18. Apparatus in accordance with claim 16, wherein said implement has a form generated by the rotation of a radial section thereof about the axis of said shaft, and means for rotating said shaft and said implement about the axis of said shaft at a speed such that the peripheral speed of the portion of said implement in contact with said tubular body of plastic material is greater than the speed of movement of the center of said implement about the axis of said tubular body.

19. Apparatus in accordance with claim 16, wherein said implement is circular in cross section in all planes perpendicular to the axis of said shaft and wherein said shaft is mounted for rotation about its own axis and in addition to its mounting for movement about said point which is spaced a substantial distance longitudinally of said shaft from said implement, a common driving means, means for rotating said shaft about its own axis from said driving means, and means for causing the additional movement of said shaft about said point from said common driving means.

20. Apparatus for forming hollow articles from organic plastic material, comprising an annular extrusion nozzle through which plastic material may be extruded to issue as a tubular body, a material working implement disposed within the tubular body of plastic material extruded from said nozzle, a shaft extending generally longitudinal of said nozzle and of said tubular body by which said implement is carried, means mounting said shaft for movement about its own axis and for additional movement about a point within said nozzle spaced a substantial distance from said implement so that said implement may be rotated about the axis of said shaft and in addition may be bodily moved by the movement of said shaft about said point so as progressively to engage the entire inner circumference of said tubular body of plastic material, means for rotating said shaft about its own axis and for additionally said shaft about said point as aforesaid, the last named means including a combined clutch and centering means arranged by the engagement of said clutch to move said shaft about said point to cause said implement to follow around the inner circumference of said body of plastic material and upon disengagement of said clutch to interrupt said drive, and means effective upon the disengagement of said clutch as aforesaid for centering said shaft in a position substantially axial of said nozzle to bring said implement to a position such that organic plastic material may be uninterruptedly extruded from said nozzle.

21. Apparatus in accordance with claim 20, wherein said shaft is mounted in a ball and socket joint at the center of which is the point about which said shaft is moved as aforesaid, a pinion on said shaft substantially centrally of said ball and socket joint and arranged to be continuously rotated independent of the angular position of said shaft about said point, a reentrant end portion on the end of said shaft opposite that to which said implement is mounted, and a continuously rotating eccentric pin movable toward and away from the reentrant portion of said shaft for moving said shaft to cause said implement progressively to engage the entire inner circumference of the tubular body of plastic material extruded from said nozzle, and means effective on the retraction of said pin for centering said shaft with said nozzle while permitting the continued rotation thereof about its own axis.

22. Apparatus in accordance with claim 20, specifically for use in forming closed-ended hollow articles, such as bottles or other containers, comprising in addition means associated with said nozzle and with said shaft for supplying pneumatic pressure through said shaft to the interior of a closed-ended hollow body of plastic material being extruded from said nozzle to prevent the collapse thereof, and thereafter for expanding such body into conformity with a mold independently of the position and the rotation of said shaft.

23. Apparatus for extruding organic plastic material in tubular form, comprising an annular nozzle including inner and outer nozzle members defining therebetween an annular extrusion passage, means for conducting organic plastic material in a moldable condition to said annular extrusion passage at one side thereof, and an eccentrically disposed baffle extending from one of said nozzle members into said annular extrusion passage constructed and arranged to provide a maximum constriction on the side of said annular extrusion passage to which plastic material is supplied and a progressively less constriction toward the other side so as to distribute the plastic material evenly about said annular extrusion passage.

24. Apparatus in accordance with claim 23, wherein said baffle comprises a rib integral with and extending outwardly from said inner nozzle member.

ENOCH T. FERNGREN.

CERTIFICATE OF CORRECTION.

Patent No. 2,283,751.  May 19, 1942.

ENOCH T. FERNGREN.

It is hereby certified that error appears in the printed specification of the above numbered patent requiring correction as follows: Page 9, second column, line 65-66, after "additionally" insert --moving--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.